3,347,913
FLUORINATION OF NITROGEN COMPOUNDS
Ralph J. Leary, Elizabeth, James R. Michael, Roselle, and Jack Rockett, Metuchen, N.J., assignors to Esso Research and Engineering Company, a corporation of Delaware
No Drawing. Filed May 27, 1959, Ser. No. 816,335
6 Claims. (Cl. 260—553)

The invention relates to the preparation of compounds which contain nitrogen and fluoride. More specifically it relates to the preparation of fluoride compounds which are rich in nitrogen by contacting nitrogen compounds with metal fluorides.

Because compounds having one or more fluorine atoms attached to nitrogen are excellent oxidizers, numerous investigations have been undertaken to prepare compounds which contain at least one N—F bond. Heretofore, all of the attempts to prepare organic compounds having such bonds have been unsuccessful principally because of the severity of the methods employed. Unless the fluorination reaction is carefully controlled fragmentation will occur. To date no satisfactory method for fluorinating nitrogen groups in organic compounds has been proposed.

The principal object of this invention is to fluorinate organic nitrogen compounds without causing undue fragmentation in the process.

It has been discovered that organic nitrogen compounds can be fluorinated with metal fluorides in either a liquid or solid phase without experiencing attending fragmentation. Moreover, it has been found that these nitrogen compounds may be partially fluorinated to produce substances which are capable of undergoing polymerization reactions.

The term "organic nitrogen compound" as used herein is intended to include those compounds which contain both carbon and nitrogen regardless of whether or not they also contain hydrogen.

In carrying out the invention a metal fluoride, the cation of which has a positive electrical potential at 25° C. (Lange's Handbook of Chemistry, 8th edition, pages 1243–1249), is contacted with an organic nitrogen compound at a temperature of about —40 to 300° C. for from a few seconds to several hours or days under a pressure ranging from 1 mm. of mercury to 20 atmospheres or more. The metal fluoride and nitrogen compound are contacted in a liquid or dry state. Where the two reactants are solids, they should possess particle sizes small enough to permit intimate contact with each other, i.e. the average diameter of the particles should not be greater than about ¼ inch. While it is not necessary to have a diluent present when the two materials are reacted in the dry state, it may be desirable to use an inert solid diluent, e.g. calcium fluoride, to avoid excessive increases in the temperature due to the heat of reaction. Because the reaction is more rapid and easier to control when the reactants are either dissolved in an inert solvent or slurried therewith, it is preferred to carry out the process in the presence of a suitable solvent or diluent. Since many of the metal fluorides are highly reactive with hydrocarbon diluents, it is advisable to use inert liquid perhalocompounds having about 4 to 12 carbon atoms. Among the organic compounds which may be used are paraffins and organic acids in which hydrogen is completely substituted with fluorine or fluorine and chlorine. Suitable perfluorinated and perchlorofluorinated compounds include dichlorooctafluorobutane, trichloroheptafluorobutane, perfluorobutyric acid, perfluoroacetic acid, perfluoropropionic acid and perfluorotri-n-butyl amine. Inorganic compounds such as hydrofluoric acid may also be used. The diluent, which preferably contains chlorine and/or fluorine, should boil substantially above the reaction temperature when used in reactions carried out below that temperature. The amount of diluent employed depends to a large extent upon the solubility of either or both of the reactants in the diluent. For instance as little as 10 or 20 wt. percent diluent based on the reactants may be used if it is desirable to have a viscous slurry of the reactants; on the other hand, where more fluid conditions are needed the reaction mixture may contain as much as 100 wt. percent of the inert diluent based on the reactants. However, generally the quantity of diluent introduced into the reaction zone should be between about 50 and 200 wt. percent. Whether the fluorination reaction is carried out in a liquid or solid medium, the reaction product may be separated from the reaction mixture by techniques well known in the art. To be specific, if the product is a gas it may be continuously removed from the reaction zone by withdrawing it overhead. If the gas is susceptible to liquefaction at lower temperatures, this may be accomplished by passing the gas through a cooling zone which is at a temperature of say about —45° C. or lower. If the product is a liquid it may be separated from the other components of the reaction mixture by filtration and distillation.

The metal fluorides which are most suitable for use in this process are those having single electrode potentials at 25° C. exceeding 0.9, e.g. 0.91 to 1.98. Among the metal fluoride compounds which may be employed in accordance with the present invention are stannic fluoride, cupric fluoride, mercuric fluoride, vanadium pentafluoride, bismuth pentafluoride, gold trifluoride, manganese trifluoride, cobalt trifluoride, silver fluoride, titanium tetrafluoride, antimony pentafluoride, chromium pentafluoride, lead tetrafluoride and silver difluoride. Of the foregoing, silver difluoride, cobalt trifluoride and mercuric fluoride are preferred. In a preferred embodiment the fluoride is admixed with the halogenated diluent before it is contacted with the nitrogen compound.

The nitrogen rich compounds should have a minimum carbon to nitrogen atomic ratio of 1:1. While this ratio may vary between 1:1 and 1:4, it is preferred to use nitrogen compounds having carbon to nitrogen ratios of about 1:2 as the substrates. The nitrogen compounds coming within the purview of the invention are those which contain an N—H bond or have an unsaturated bond attached to the nitrogen. Thus, the nitrogen compound should have at least one of the following groups which will react with fluorine either by addition or substitution:

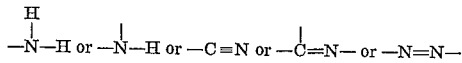

The compounds, which may be saturated or unsaturated, cyclic or acyclic, contain one or more of the above-mentioned amine, imine, cyano and hydrazine groups. The following is a list of organic nitrogen compounds containing 1 to 4 carbon atoms which may be fluorinated with the above-mentioned metal fluorides: urea, biurea, guanidine, biguanidine, dicyanamide, tetrazole, melamine and semicarbazide.

The amount of metal fluoride reacted with the nitrogen compound depends upon the number of active sites which the nitrogen compound contains. For instance, two equivalents of fluorine are necessary for each N—H bond or double bond in the nitrogen compound and four equivalents of fluorine are necessary for each acetylenic bond in the compound.

Depending upon the reactivity of the fluoride, it may be necessary to employ higher or lower reaction temperatures. In general the reaction temperature will vary inversely with the cation potential of the metal fluoride. At atmospheric pressure the fluorination reactions can be carried out at temperatures between 15 and 250° C. It is advisable to blanket the reactants with an inert gas, such as nitrogen or helium, to prevent undesirable side reactions from taking place while the reactants are in the reaction zone.

When it is desired to only partially fluorinate the nitrogen compound in order to retain polymerization activity in the substrate, the reaction conditions must be adjusted to avoid total fluorination. For instance where the addition reaction takes place at a higher temperature than the substitution reaction, fluorine may be substituted in the nitrogen compound without appreciably affecting the unsaturation of the substrate. The unsaturated fluorinated compounds may be polymerized to produce high molecular weight substances containing substantial amounts of nitrogen and fluorine.

The nitrogen compounds fluorinated in accordance with the invention may be used as oxidizers in solid rocket propellants which utilize a metal or metal hydride as fuel. Suitable metal hydride fuels include such things as boron hydride, aluminum hydride and lithium hydride. Aside from their use in rocket propellants, these fluorine-containing nitrogen compounds may be used as oxidizing agents in many chemical reactions.

The following examples serve to demonstrate how the present invention may be carried out with specific reactants.

*Example 1*

In a 500 cc. three-necked flask equipped with a stirrer, reflux condenser and nitrogen inlet, was placed 22.2 grams of finely divided silver difluoride. The condenser was connected with a series of traps cooled with a Dry Ice-acetone mixture. A mercury filled gas buret was attached to the last trap to collect the gaseous product. To the silver difluoride in the flask was added 1.171 grams of urea which almost instantly commenced to react with the silver difluoride and produced gas. It was noted that the temperature of the reaction mixture increased from 25° C. to about 55° C. Portions of the gas caught in the Dry Ice traps were analyzed in an infrared spectrophotometer. The first 250 cc. of gas strongly absorbed light having a wave length of 5.1 to 5.2$\mu$. This indicates the presence of a carbonyl group in the product. In addition there was a very strong absorption peak at 9.65 to 9.75$\mu$ which shows the presence of an N—F bond. When another portion of this gas was passed through an aqueous solution of potassium iodide, the iodide ion was oxidized rapidly to molecular iodine. A second 250 cc. portion of the gas produced showed a similar carbonyl function and N—F bond. This sample of gas also oxidized potassium iodide to iodine.

*Example 2*

The process described in Example 1 was repeated with 32 grams of mercuric fluoride, 2 grams of urea and 30 cc. of hexachlorododecafluorooctane. The liquid reaction mixture was vigorously stirred under a blanket of nitrogen while its temperature was maintained between 125 and 130° C. for 13 hours. Thereafter, it was heated to 195 to 205° C. for 5 hours and the gaseous product recovered in the Dry Ice-isopropanol traps was analyzed for infrared activity. The product had a peak at 5.72$\mu$ which indicates the presence of a carbonyl group. Peaks were also noted at 9.72, 10.35 and 10.98$\mu$ indicating the presence of —NF$_2$ groups. The foregoing data together with a total spectroanalysis shows that the gas contains a substantial amount of perfluorourea.

*Example 3*

The process described in Example 2 was repeated except that 40.8 grams of cobalt trifluoride was reacted with 2.4 grams of urea in the presence of 60 cc. of hexachlorododecafluorooctane. The reaction mixture was heated to 90 to 110° C. for 16 hours and the perfluorourea product was collected in the Dry Ice traps. The product exhibited a carbonyl peak at 5.6$\mu$ and —NF$_2$ peak at 10.5 to 11.1$\mu$ in the infrared spectrum.

*Example 4*

Example 3 was repeated except that the cobalt trifluoride was admixed with the diluent and heated to 160° prior to incrementally adding the urea to the fluoride. The pretreatment reduced the reaction time to about 1 hour and substantially increased the yield of perfluorourea obtained in the process.

Resort may be had to various modifications and variations of the present invention without departing from the spirit of the discovery or the scope of the appended claims.

What is claimed is:

1. A process for fluorinating urea which comprises contacting and reacting urea in liquid phase with 2 equivalents of a metal fluoride selected from the group consisting of silver difluoride, cobalt trifluoride, and mercuric fluoride for each N—H bond of the urea reacted in the presence of an inert halogenated C$_4$ to C$_{12}$ organic liquid diluent at a temperature of 15° to 250° C. until perfluorourea is formed by substitution of F for H in each N—H bond of the urea reacted.

2. A process according to claim 1 in which the metal fluoride is silver difluoride.

3. A process according to claim 1 in which the metal fluoride is mercuric fluoride.

4. A process according to claim 1 in which the metal fluoride is cobalt trifluoride.

5. A process according to claim 1 in which the diluent is hexachlorododecafluorooctane.

6. A process for fluorinating an organic nitrogen compound containing an N—H bond which comprises contacting and reacting in liquid phase an organic nitrogen compound selected from the group consisting of urea, biurea, guanidine, biguanidine, dicyanamide, tetrazole, melamine and semicarbazide with 2 equivalents of a metal fluoride selected from the group consisting of silver difluoride, cobalt trifluoride, and mercuric fluoride for each N—H bond in the presence of an inert halogenated C$_4$ to C$_{12}$ organic liquid diluent at 15° to 250° C. for a sufficient time to fluorinate the organic nitrogen compound by substituting F or H in the N—H bond.

References Cited

UNITED STATES PATENTS

| | | | |
|---|---|---|---|
| 2,403,576 | 7/1946 | Bradley | 260—561 |
| 2,442,290 | 5/1948 | Halbedel | 260—464 |
| 2,567,569 | 9/1951 | McBee | 260—563 |
| 2,614,129 | 10/1952 | McBee | 260—648 |
| 2,845,421 | 7/1958 | Grundmann | 260—248 |

OTHER REFERENCES

Lovelace et al. "Aliphatic Fluorine Compounds," pp. 3–12 (1958), Reinhold Publishing Corp.

HENRY R. JILES, *Primary Examiner.*

L. D. ROSDOL, R. L. CAMPBELL, *Examiners.*

W. I. ANDRESS, J. W. WHISLER, *Assistant Examiners.*